(12) United States Patent
Katzourakis et al.

(10) Patent No.: US 10,351,162 B1
(45) Date of Patent: Jul. 16, 2019

(54) SUSPENSION ARCHITECTURE FOR STEER-BY-WIRE VEHICLE

(71) Applicants: Diomidis Katzourakis, Chania (GR); Huibert Mees, Pleasanton, CA (US); Johannes A. Huennekens, San Jose, CA (US); Robin A. Auckland, Sunnyvale, CA (US); Paul W. Choin, Sunnyvale, CA (US)

(72) Inventors: Diomidis Katzourakis, Chania (GR); Huibert Mees, Pleasanton, CA (US); Johannes A. Huennekens, San Jose, CA (US); Robin A. Auckland, Sunnyvale, CA (US); Paul W. Choin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 15/652,961

(22) Filed: Jul. 18, 2017

Related U.S. Application Data

(60) Provisional application No. 62/364,106, filed on Jul. 19, 2016.

(51) Int. Cl.
*B62D 5/00* (2006.01)
*B62D 5/04* (2006.01)
*B62D 7/18* (2006.01)
*B62D 6/00* (2006.01)
*B62D 6/10* (2006.01)
(Continued)

(52) U.S. Cl.
CPC ............ *B62D 5/005* (2013.01); *B60G 21/05* (2013.01); *B60K 7/0007* (2013.01); *B60T 8/246* (2013.01); *B62D 5/0463* (2013.01); *B62D 5/0475* (2013.01); *B62D 6/005* (2013.01); *B62D 6/008* (2013.01); *B62D 6/10* (2013.01);
(Continued)

(58) Field of Classification Search
CPC .................. B60G 21/05; B60K 7/0007; B60K 2007/0046; B60T 8/246; B60T 2260/02; B62D 5/005; B62D 6/008; B62D 6/10; B62D 5/0463; B62D 6/005; B62D 5/0475; B62D 7/18
USPC ....................................................... 180/253
See application file for complete search history.

(56) References Cited

U.S. PATENT DOCUMENTS 4,951,199 A 8/1990 Whitehead
6,293,022 B1 9/2001 Chino et al.
(Continued)

FOREIGN PATENT DOCUMENTS

CN 101973307 A 2/2011
JP 2012240456 A 12/2012

*Primary Examiner* — Kevin Hurley
*Assistant Examiner* — Felicia L. Brittman
(74) *Attorney, Agent, or Firm* — Young Basile Hanlon & MacFarlane, P.C.

(57) ABSTRACT

A vehicle has a wheel, a frame, a suspension component, a steering knuckle, and a steering system. The suspension component is connected to the frame. The steering knuckle is connected to the suspension component and is connected to the wheel. The suspension component is operable to control vertical movement of the steering knuckle and the wheel relative to the frame. The suspension component and the steering knuckle define a steering axis for the wheel. The steering axis has a caster inclination angle of zero degrees. The steering system is connected to the suspension component and controls a steering angle of the wheel based on an electronic control signal.

19 Claims, 12 Drawing Sheets

(51) Int. Cl.
   *B60K 7/00*   (2006.01)
   *B60G 21/05*   (2006.01)
   *B60T 8/24*   (2006.01)

(52) U.S. Cl.
   CPC ........ *B62D 7/18* (2013.01); *B60K 2007/0046* (2013.01); *B60T 2260/02* (2013.01)

(56) References Cited

U.S. PATENT DOCUMENTS

| | | |
|---|---|---|
| 9,669,869 B2 | 6/2017 | Kageyama et al. |
| 2006/0080016 A1 | 4/2006 | Kasahara et al. |
| 2013/0245890 A1* | 9/2013 | Kageyama ............... B62D 7/18 701/41 |
| 2017/0137059 A1* | 5/2017 | Ohba ....................... B60K 7/00 |

* cited by examiner

SUSPENSION ARCHITECTURE FOR STEER-BY-WIRE VEHICLE

CROSS-REFERENCE TO RELATED APPLICATIONS

This application claims the benefit of U.S. Provisional Application No. 62/364,106, filed on Jul. 19, 2016 and entitled "SUSPENSION ARCHITECTURE FOR STEER-BY-WIRE VEHICLE," which is incorporated herein by reference in its entirety.

TECHNICAL FIELD

This disclosure relates generally to a vehicle suspension architecture, and more specifically in at least some examples to a suspension architecture for a vehicle employing a steer-by-wire configuration.

BACKGROUND

A vehicle suspension connects a vehicle to its wheels and in a manner that allows relative movement between the chassis of the vehicle and the wheels. The vehicle suspension facilitates accurate steering and handling of the vehicle on a variety of surfaces while promoting a comfortable ride for the passengers of the vehicle. Conventional steering systems have a direct mechanical connection of a steering wheel to the steered wheels. In some systems, this connection includes a power-assisted steering system. Examples of power-assisted steering systems include a hydraulic power-assisted steering (HPAS) system and an electrically power-assisted steering (EPAS) system.

Vehicle steering and suspension components are typically designed and configured to provide a mechanical alignment of the wheels. The mechanical alignment of the wheels enhances the experience of the driver, such as by compensation for wheel disturbances (e.g., wheel imbalance, shimmy effects, design tolerances, and uneven tire wear), providing directional stability, providing an enhanced steering feel for the driver, and causing self-alignment of the wheels (e.g., a tendency to align the wheels so that the vehicle may move forward instead of turning).

To provide the attributes mentioned above, the steering axis of each wheel to be used for steering is typically inclined with respect to the vertical axis of the wheel, both in side view as well as in front or back view. The steering axis is also typically offset with respect to the center of the wheel. Based on these steering axis properties, moment arms are generated in the ground with the respect to a contact patch (e.g., the area of contact between the tire and the ground). More specifically, a kingpin trail (e.g., the distance, viewed from the front or back of the vehicle, from the center of the contact patch to the intersection of the steering axis with the ground) provides a moment arm that generates an aligning moment about the steering axis due to longitudinal forces at the tire, such as acceleration and braking. A caster trail (e.g., the distance, viewed from the side of the vehicle, from the center of the contact patch to the intersection of the steering axis with the ground) facilitates a moment arm that generates an aligning moment about the steering axis due to lateral forces at the wheel, such as while cornering or turning. However, these moments also tend to produce "jacking" (e.g., lifting or diving) effects at the center of the wheel, causing the body of the vehicle to lift or dive in reaction thereto.

In addition, the tires typically employed as part of the wheels of a vehicle tend to provide steering self-alignment while cornering. More specifically, during a turn, lateral forces tend to be concentrated behind the center of the contact patch at a pneumatic trail. Due to those forces, a lateral force toward the direction of the turn is produced at the pneumatic trail, thus causing a self-aligning torque on the wheel.

Due to both the mechanical and pneumatic attributes discussed above, the HPAS or EPAS system employed to assist the driver in steering the vehicle must continually overcome the mechanical self-alignment, pneumatic self-alignment, and jacking effects described above to perform the steering indicated by the driver. Moreover, the inclined steering axis also tends to increase tire wear and wheel rolling resistance.

SUMMARY

One aspect of the disclosed embodiments is a vehicle that has a wheel, a frame, a suspension component, a steering knuckle, and a steering system. The suspension component is connected to the frame. The steering knuckle is connected to the suspension component and is connected to the wheel. The suspension component is operable to control vertical movement of the steering knuckle and the wheel relative to the frame. The suspension component and the steering knuckle define a steering axis for the wheel. The steering axis has a caster inclination angle of zero degrees. The steering system is connected to the suspension component and controls a steering angle of the wheel based on an electronic control signal.

Another aspect of the disclosed embodiments is a vehicle that includes a frame having a first lateral side and a second lateral side, a first wheel located on the first lateral side of the frame, and a second wheel located opposite the second lateral side of the frame. A first steering knuckle connected to the first wheel, and a first suspension component connects the first steering knuckle to the frame. The first steering knuckle and the first suspension component define a first steering axis for the first wheel, the first steering knuckle and the first suspension component facilitate vertical movement of the first wheel relative to the frame, and the first steering axis has a first caster inclination angle of zero degrees. A second steering knuckle is connected to the second wheel, and a second suspension component connects the second steering knuckle to the frame. The second steering knuckle and the second suspension component define a second steering axis for the second wheel, the second steering knuckle and the second suspension component facilitate vertical movement of the second wheel relative to the frame, and the second steering axis defines a second caster inclination angle of zero degrees. A steering mechanism is connected to the first steering knuckle and the second steering knuckle to steer the first wheel and the second wheel, a steering motor connected to the steering mechanism to operate the steering mechanism, and a steering motor controller controls the steering motor.

Another aspect of the disclosed embodiments is a vehicle that includes a frame, steered wheels, and suspension components that connect the steered wheels to the frame and define a caster inclination angle of zero degrees for each of the steered wheels. A steering mechanism is operable to steer the steered wheels. A steering motor is connected to the steering mechanism to operate the steering mechanism, a steering motor controller controls the steering motor, and a steering input device outputs a signal representing user control of the steering input device. The steering input device is mechanically disconnected from the steering mechanism, and the steering motor controller is configured to control the steering motor based on the signal from the steering input device.

BRIEF DESCRIPTION OF THE DRAWINGS

The description herein will be made with reference to the following drawings.

DETAILED DESCRIPTION

The description herein relates to a vehicle suspension system that may include a suspension component that is connected to a frame of a vehicle, and a steering knuckle that connects the suspension component to a wheel to be used for steering the vehicle. The steering knuckle, when connected to the frame by the suspension component, and to the wheel, defines a steering axis for the wheel with a caster inclination angle of zero degrees. As used herein, all recitations of a specific value refer to a range that includes the value and values that are within typical manufacturing tolerances of the value. Such ranges include the exact value itself, which is referred to explicitly when intended, for example, in a statement such as "exactly zero degrees."

Use of a caster inclination angle of zero degrees would be primarily relevant by control systems that lack a direct mechanical control connection between the steered wheels and an input device (e.g., a steering wheel) that is operated by a user. Examples of control systems that lack a direct mechanical control connection include steer-by-wire systems and autonomous control systems.

Without the attendant concerns of mechanical self-alignment, steering feel, and other suspension characteristics that may affect the driver in a vehicle employing a conventional steering system, the orientation and position of the steering axis may be as described herein, potentially allowing the use of smaller and/or lighter suspension components, smaller and/or lighter steering mechanism components, a smaller and/or lighter steering actuator or motor, and/or a lighter and/or smaller steering actuator mounting mechanism. Moreover, such a suspension design may also provide less tire wear due to reduced tire scrubbing when the wheels are turned and better directional stability in view of a steer-by-wire system.

Additionally, use of the vehicle suspension embodiments described herein may facilitate additional functionality in the steering and/or suspension system, including, but not limited to, steer-by-brake. Other potential aspects and advantages of the various embodiments of the vehicle suspension system are discussed more fully below.

Figure 1:
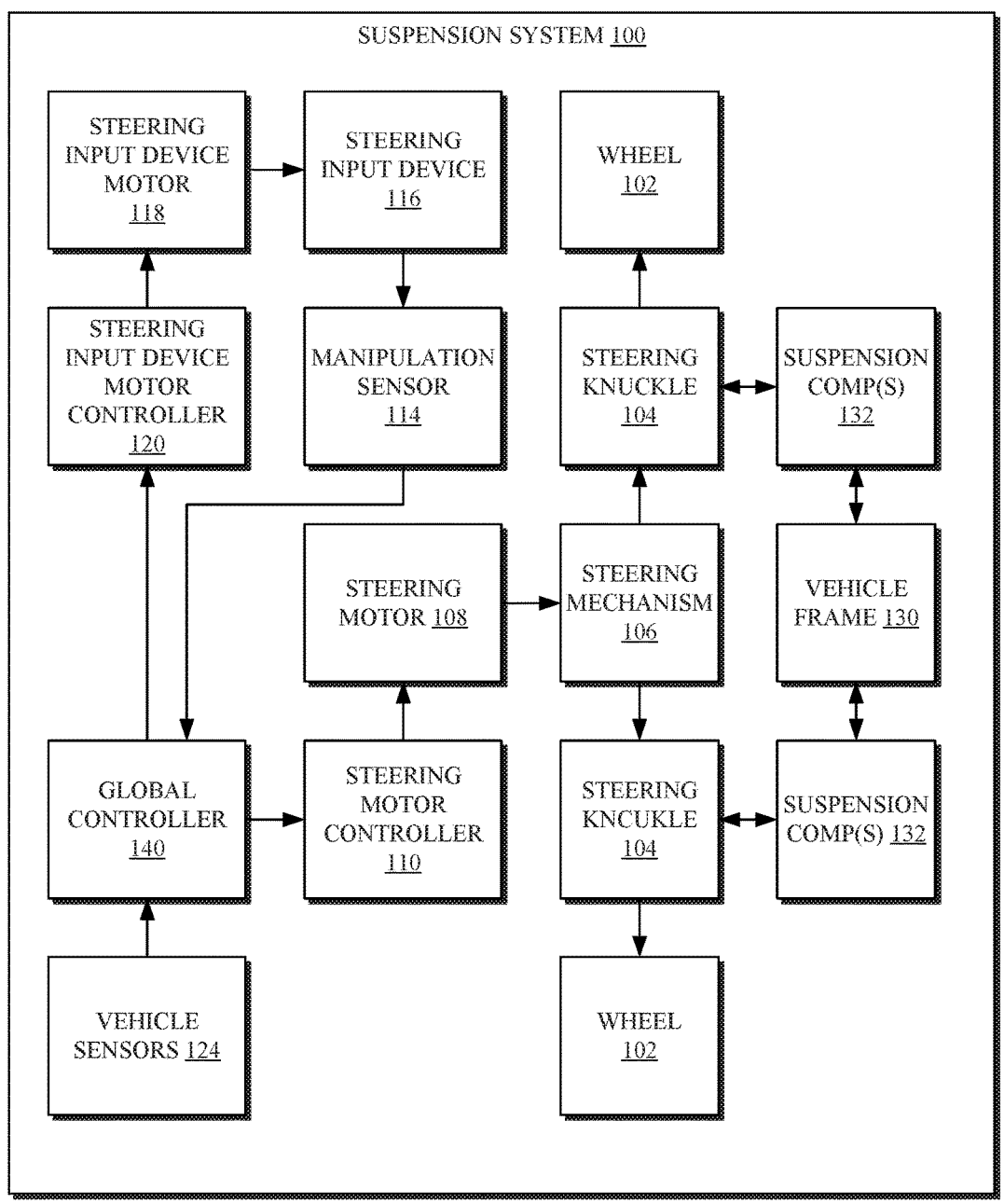
FIG. 1 is a block diagram of an example of a suspension system.

FIG. 1 is a block diagram of a suspension system 100. As depicted, the suspension system 100 may incorporate at least some aspects of an electrical steer-by-wire steering system, although other types of steering systems may be employed in other embodiments. Moreover, the suspension system 100 may be employed in any number of types of motor vehicles, regardless of the type of energy or fuel employed, including, but not limited to, passenger cars, trucks, sport utility vehicles, heavy-duty industrial equipment, and single-person transportation devices.

The suspension system 100, as depicted in FIG. 1, may include a vehicle frame 130, one or more steering knuckles 104 or similar structures, one or more suspension components 132, one or more wheels 102, a steering motor 108, and a steering motor controller 110. The wheels 102 may include pneumatic tires or other friction-enhancing structures. The suspension system 100 may also include a steering input device 116, a manipulation sensor 114, a steering input device motor 118, and a steering input device motor controller 120. Additionally, a global controller 140, as well as one or more vehicle sensors 124, may be provided in the suspension system 100.

The suspension system 100 may include greater or fewer components than shown in FIG. 1. Further, some components of FIG. 1 may be combined with other components, and/or some components of FIG. 1 may be separated into distinct multiple components, in other embodiments. Also, additional components that may be included in the suspension system 100, such as specific types of control arms, tie rods, wheel hubs, coil springs, shock absorbers, sway bars, struts, ball joints, and so on, are not depicted in FIG. 1 to focus and facilitate the discussion of various aspects of the suspension system 100 presented below. Some components included in FIG. 1, such as the vehicle frame 130, the wheels 102, and the vehicle sensors 124, and so on, may not be considered components of the vehicle suspension system 100 in some embodiments, but are included herein to facilitate the discussion to follow. In yet other implementations, the suspension system 100 may be organized as separate suspension and steering systems.

The vehicle frame 130 may be a vehicle chassis or other structure to which one or more of the suspension components 132 may be connected. As shown in FIG. 1, two sets of one or more suspension components 132, one corresponding to each wheel 102 and associated steering knuckle 104, are provided. Each set of suspension components 132 movably connect a corresponding one of the steering knuckles 104 to the frame to allow vertical relative motion between the steering knuckle 104 (and, consequently, the wheel 102) and the vehicle frame 130. In some contexts provided below, each wheel 102 may include a tire mounted thereon. As employed herein, the wheels 102 are located on opposing lateral sides of the vehicle, but other relative positions are also possible. One or both wheels 102 may or may not be drive wheels (e.g., connected with a propulsion or traction motor to propel the vehicle). Also, while two of the wheels 102 are depicted in FIG. 1, a single wheel or more than two wheels, with associated steering knuckles 104 and suspension components 132, may be utilized in other examples. The steering knuckle 104 may be connected to the wheel 102 such that the wheel 102 may spin about a rotational axis relative to the steering knuckle 104, but may otherwise be fixed in position and orientation relative to the steering knuckle 104. Movement of the steering knuckle 104 about a steering axis at least partially defined by the steering knuckle 104 may cause the corresponding one of the wheels 102 to rotate about that axis to provide steering functionality. The steering knuckle 104 and the wheel 102 may be connected therebetween via a hub or other mechanical structure or connection.

The steering mechanism 106 may be connected to each steering knuckle 104 to alter the orientation of the wheels 102 to steer the vehicle. The orientation of the wheels 102 may be referred to as a steering angle. The connection of the steering mechanism 106 to the steering knuckles 104 may be provided by way of tie rods and/or other structures. The steering mechanism 106 may be any mechanism, system, or arrangement capable of being driven by the steering motor 108 to translate or otherwise steer the wheels 102 via the steering knuckles 104. An example of the steering mechanism 106 is be a rack-and-pinion system that transforms a rotational movement of the steering motor 108 to a translational movement that is transmitted to a portion of the steering knuckles 104, but other types of steering mechanisms 106 are also possible. The steering motor 108, in turn, may be controlled by way of a steering motor controller 110 that receives input from a global controller 140 and outputs current, voltage, and/or the like to operate the steering motor 108. The steering motor 108 may be a direct-current (DC) servo motor, an alternating-current (AC) servo motor, or another type of electric motor.

The steering input device 116 may be a steering wheel. In other examples, the steering input device may be a joystick or any other device that the driver may physically manipulate to steer or direct the vehicle in one or more particular directions. As illustrated in FIG. 1, no mechanical connection is provided between the steering input device 116 and the steering mechanism 106 that transmits mechanical movement of the steering input device 116 into mechanical movement of the steering mechanism 106. Such a system may be viewed as a steer-by-wire system. While the various embodiments of the suspension system 100 described below employ a steer-by-wire arrangement, other possible examples are not limited in that manner. For example, the vehicle may lack an input device by which a user can directly control steering, and instead utilize control from an autonomous control system.

A manipulation sensor 114 may be connected with the steering input device 116 to detect a position, a torque, and/or other physical characteristic imparted by a driver of the vehicle, and provide an indication of that characteristic to the global controller 140 or other controller. The manipulation sensor 114 may be, for example, a torsion bar that measures a torque being applied to the steering input device 116 by the driver, an optical encoder or other positional sensor that determines a position of the steering input device 116, and/or other position or force measurement sensor. In at least some examples, the global controller 140 may interpret the indication received from the manipulation sensor as a direction in which the driver desires to steer the car, and may operate the steering mechanism 106 via the steering motor controller 110 and the steering motor 108 accordingly. In some examples, the global controller 140 may enhance its control of the steering mechanism 106 beyond what is strictly indicated by the driver via the steering input device 116, as is described in greater detail below. In yet other implementations, the global controller 140 may impart partially or fully autonomous steering upon the steering mechanism 106 based on information not derived from the steering input device 116, such as from one or more vehicle sensors 124. The vehicle sensors 124 may include, but are not limited to, acceleration and/or velocity sensors, object detection sensors (e.g., radar, lidar, sonar, infrared cameras, or visible spectrum cameras), and so on.

In some examples, the global controller 140 may be hardware capable of performing the operations ascribed thereto, as discussed more fully below. In other embodiments, the global controller 140 may include at least one hardware processor (e.g., microprocessor, microcontroller, digital signal processor (DSP), etc.) and memory including software, firmware, or other instructions executable by the hardware processors to perform those functions. In yet other examples, the global controller 140 may incorporate a combination of hardware, software, and/or firmware aspects.

In addition to the global controller 140 controlling the steering mechanism 106 via the steering motor controller 110 and the steering motor 108, the global controller 140 may also control a position, speed, or other physical characteristic of the steering input device 116 by way of the steering input device motor controller 120 to provide physical feedback (e.g., haptic feedback) to the driver via the steering input device 116. In one embodiment, the global controller 140 may provide an indication of a desired position of the steering input device 116. The steering input device motor controller 120, in turn, may then provide the appropriate current, voltage, and/or other quantity to the steering input device motor 118 to alter the position of the steering input device 116 accordingly. In one example, the steering input device motor 118 may be any electric motor compatible with the steering input device 116 for moving the steering input device 116 as directed by the global controller 140.

While FIG. 1 depicts the global controller 140 as controlling both the steering input device 116 and the steering mechanism 106, other implementations, including examples provided hereafter, may employ two separate controllers for operating the steering input device 116 and the steering mechanism 106, and a global controller function may be distributed among other components.

Figure 2A:
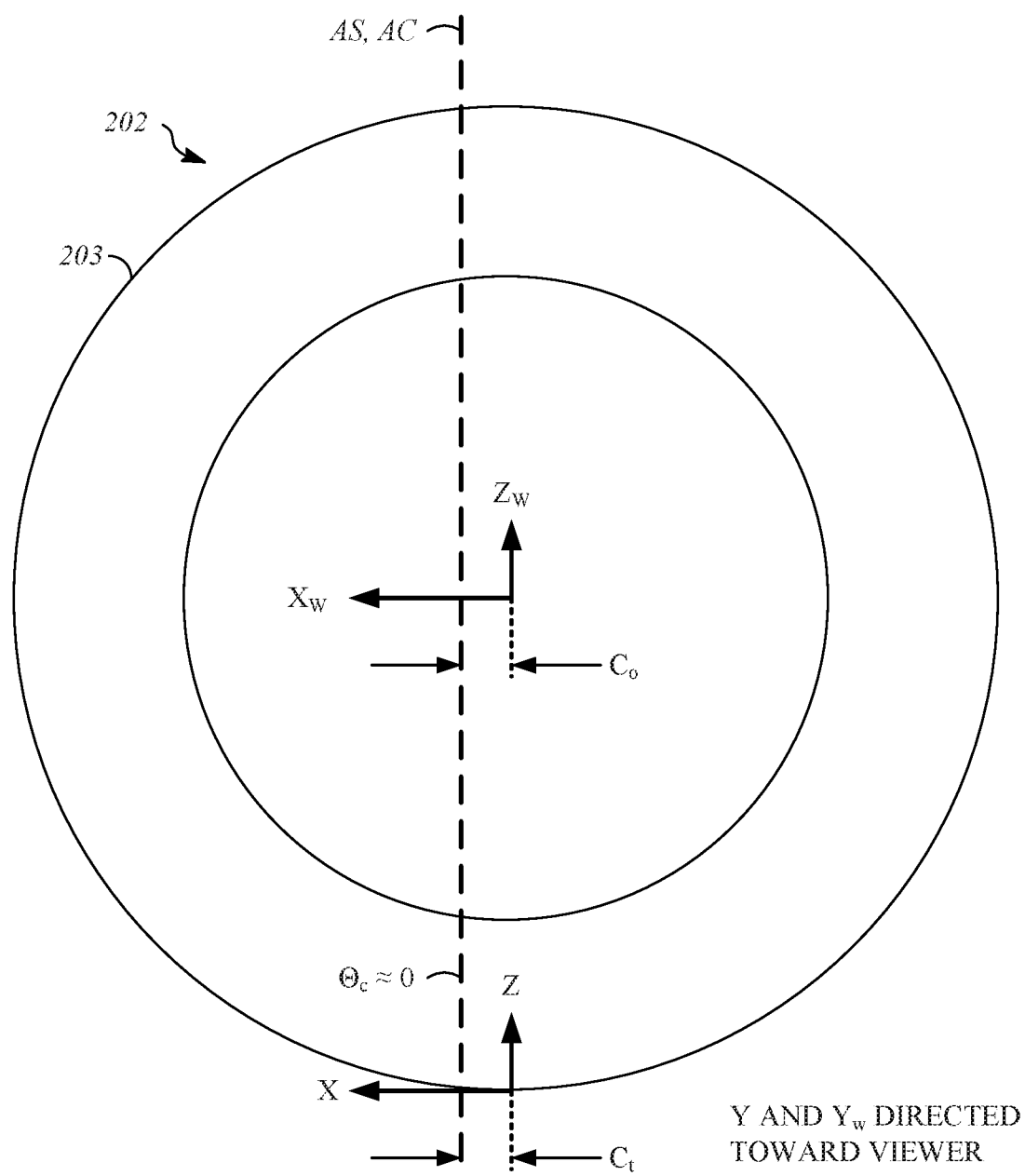
FIG. 2A is a side view of a right front wheel of a vehicle, when viewed from a left side of the wheel, employing an example steering axis for the wheel.
Figure 2B:
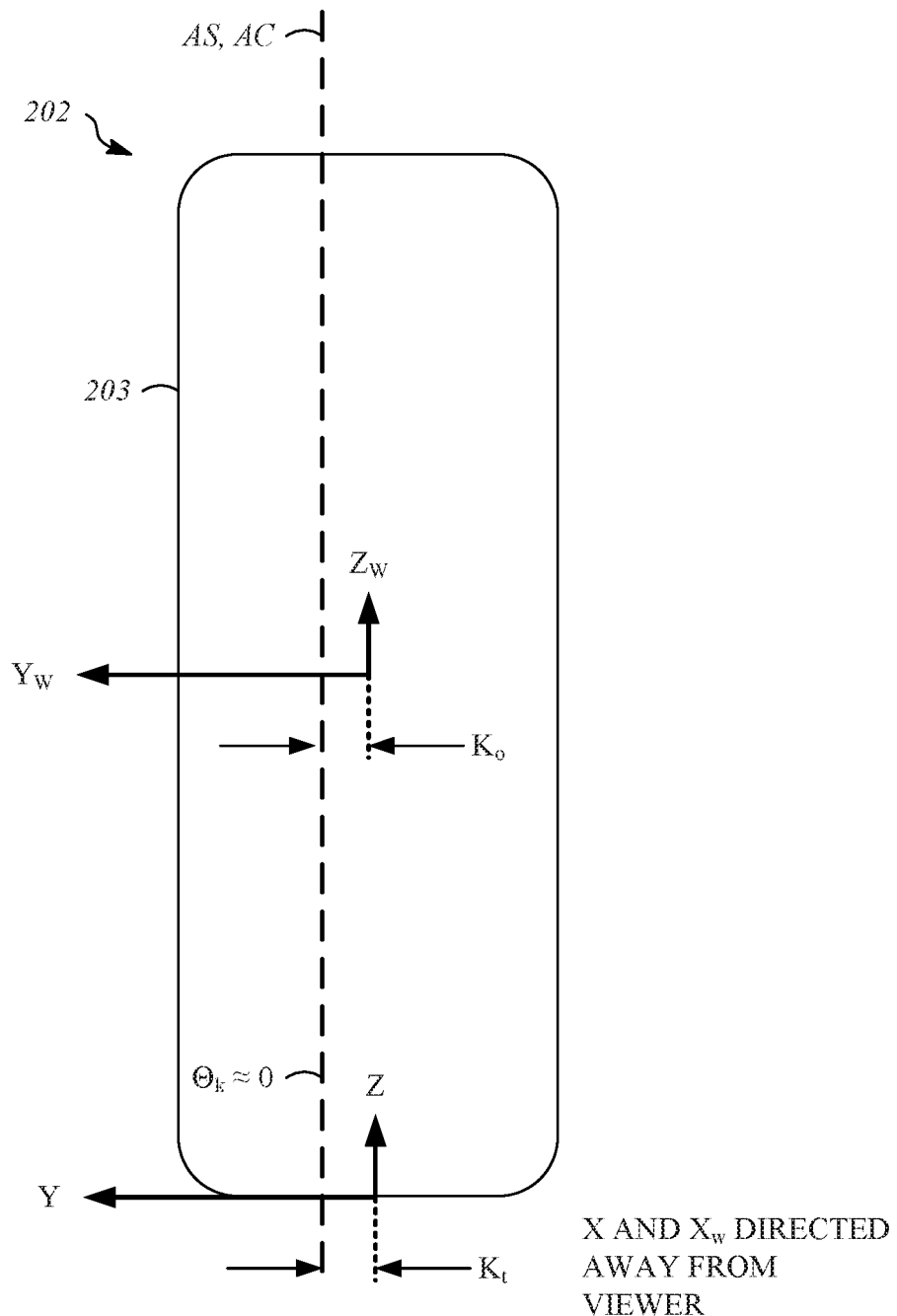
FIG. 2B is a rear view of the right front wheel of FIG. 2A, employing the example steering axis.
Figure 2C:
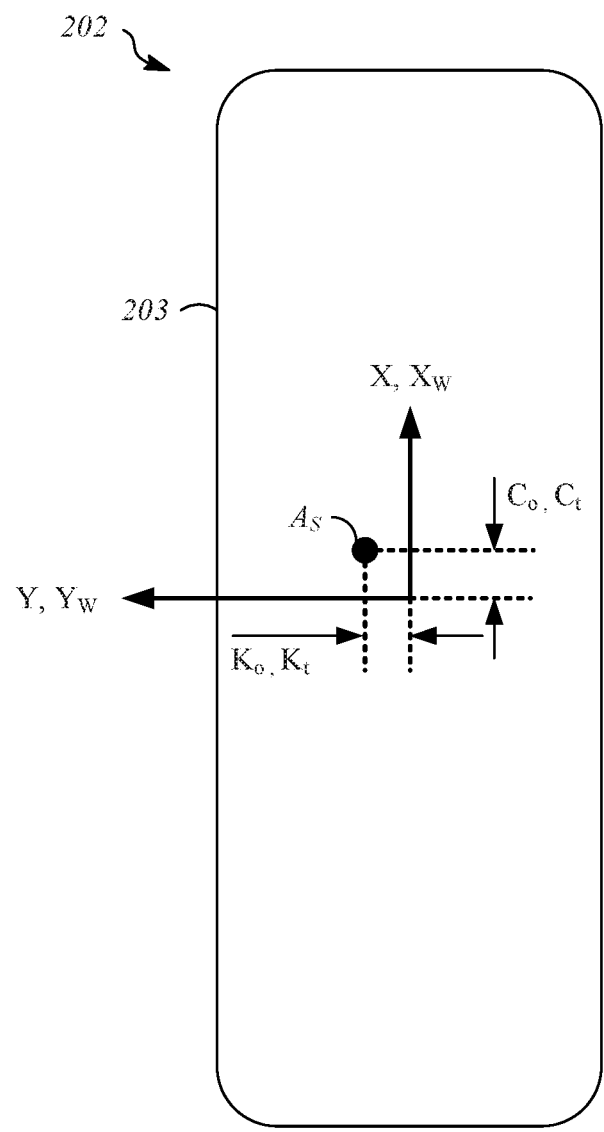
FIG. 2C is a top view of the right front wheel of FIG. 2A, employing the example steering axis.

FIGS. 2A through 2C are different views of a right front wheel 202 of a vehicle and a tire 203 that is mounted on the right front wheel 202. In these drawings, two systems of reference axes are shown: a wheel-centric reference system originating at a center of the right front wheel 202 (the axes being designated as $X_W$, $Y_W$, and $Z_W$), and a global reference system originating at a presumed center of the contact patch at which the tire 203 contacts the ground (the axes being designated as X, Y, and Z). The wheel-centric reference system is oriented with the right front wheel 202 such that the $X_W$ axis is directed perpendicular to a spindle (rotational) axis of the right front wheel 202, toward the front of the vehicle and parallel to the ground; the $Y_W$ axis is directed along the spindle axis of the right front wheel 202 toward the left of the vehicle; and the $Z_W$ axis is directed upward and orthogonal to the $X_W$ and $Y_W$ axes. The global reference system is oriented such that the X axis is directed toward the front of the vehicle (e.g., parallel to a longitudinal centerline of the vehicle) along the ground; the Y axis is directed toward the left of the vehicle (e.g., perpendicular to the longitudinal centerline of the vehicle) along the ground; and the Z axis is aligned vertically relative to the ground, thus being orthogonal to the X and Y axes.

The two reference systems are employed in the following discussion, as well as in FIGS. 2A through 2C, to describe the position and orientation of a steering axis $A_S$ of the right front wheel 202. The steering axis $A_S$ is the axis about which the right front wheel 202 is rotated to turn the vehicle. The steering axis $A_S$ may be defined by connection of one of the suspension components 132 to the steering knuckle 104. In some examples described below, two control joints are employed between the suspension components 132 and the steering knuckle 104 to define the steering axis $A_S$.

To more fully describe the steering axis $A_S$, reference is made herein to two related virtual axes: a caster axis $A_C$ and a kingpin axis $A_K$. The caster axis $A_C$ is the projection of the steering axis $A_S$ onto the X-Z plane, or as viewed along the Y axis (e.g., from a side view of the right front wheel 202). The kingpin axis $A_K$ is the projection of the steering axis $A_S$ onto the Y-Z plane, or as viewed along the X axis (e.g., from a front or rear view of the right front wheel 202).

Given the caster axis $A_C$ and the kingpin axis $A_K$, several numeric values describing the steering axis $A_S$ may then be determined. For example, a caster inclination angle $\theta_C$ is the angle between the caster axis $A_C$ and the Z axis, wherein the caster inclination angle $\theta_C$ is positive when the caster axis $A_C$ leans toward the positive X direction (e.g., toward the front of the vehicle). Correspondingly, a kingpin inclination angle $\theta_K$ is the angle between the kingpin axis $A_K$ and the Z axis, wherein the kingpin inclination angle $\theta_K$ is positive when the kingpin axis $A_K$ leans toward the positive Y direction (e.g., toward the longitudinal centerline of the vehicle). Moreover, a caster offset $C_o$ is the shortest distance from the $Y_W$ axis to the intersection of the caster axis $A_C$ with the $X_W$-$Y_W$ plane (e.g., when $Z_W$=0) in the $X_W$ direction, and a kingpin offset $k_o$ is the shortest distance from the $X_W$ axis to the intersection of the caster axis $A_C$ with the $X_W$-$Y_W$ plane (e.g., when $Z_W$=0) in the $Y_W$ direction. Additionally, a caster trail $c_t$ is the shortest distance from the Y axis to the intersection of the caster axis $A_C$ with the X-Y plane (e.g., when Z=0) in the X direction, while a kingpin trail $k_t$ is the shortest distance from the X axis to the intersection of the caster axis $A_C$ with the X-Y plane (e.g., when Z=0) in the Y direction. Further, a scrub radius may then be the distance from the origin of the global reference system (X=Y=Z=0) to a point X equal to the caster trail $c_t$, to a point Y equal to the kingpin trail $k_t$, and Z=0 or alternatively, the distance from the origin of the global reference system to the intersection of the steering axis $A_S$ with the X-Y plane.

Additionally, a value termed a camber angle represents a relationship between the two reference systems, and thus a lean of the right front wheel 202 relative to vertical. The camber angle is the angle of the $Z_W$ axis relative to the Z axis when viewed from the rear of the vehicle in the positive X direction, with a lean toward the longitudinal centerline of the vehicle representing a negative camber angle value (unlike the kingpin inclination angle $\theta K$, which is positive when the kingpin axis $A_K$ leans toward the longitudinal centerline of the vehicle, as discussed above).

Returning to FIGS. 2A through 2C, FIG. 2A is a side view of the right front wheel 202 and the tire 203 when viewed from a left side of the right front wheel 202 (e.g., from the longitudinal centerline of the vehicle to the right), FIG. 2B is a rear view of the right front wheel 202, and FIG. 2C is a top view of the right front wheel 202, all employing the same steering axis $A_S$. As shown, the right front wheel 202 provides no appreciable camber angle (or an angle of zero degrees, with the right front wheel 202 being vertical when viewed from the rear view or the top view. However, a camber angle from approximately −4 degrees to approximately +4 degrees may be employed in some examples. Also in the embodiment of FIGS. 2A through 2C, the steering axis $A_S$ (or the caster axis $A_C$) exhibits a caster inclination angle $\theta_C$ of zero degrees subject to manufacturing tolerances. (See FIGS. 2A and 2C.) Further, the steering axis $A_S$ (or the kingpin axis $A_K$) exhibits a kingpin inclination angle $\theta K$ of zero degrees subject to manufacturing tolerances. (See FIGS. 2B and 2C.) This vertical orientation for the steering axis $A_S$ results in the steering axis $A_S$ appearing substantially as a point in the top view of FIG. 2C. In other examples, presuming the camber angle is nonzero, the kingpin inclination angle $\theta K$ may instead equal the negative of the camber angle. For example, for a static camber angle (e.g., the camber angle of the right front wheel 202 when the vehicle is at rest) of −0.5 degrees, a kingpin inclination angle $\theta K$ of +0.5 degrees may be employed. Consequently, the kingpin axis $A_K$ may thus be parallel to the $Z_W$ axis when viewed from the front or rear of the vehicle. In addition, as shown in the top view of FIG. 2C, the steering axis $A_S$ may appear substantially as a point when the caster inclination angle $\theta_C$ and the kingpin inclination angle $\theta K$ are zero degrees.

Also in the example of FIGS. 2A through 2C, the steering axis $A_S$ may be offset along either or both the positive X axis and/or the positive Y axis. As shown to greatest effect in FIG. 2C, the steering axis $A_S$ may thus have a positive caster offset $c_o$ (e.g., toward the front of the vehicle) and/or a positive kingpin offset $k_o$ (e.g., toward the longitudinal centerline of the vehicle). In some examples, either or both of the caster offset $c_o$ and/or the kingpin offset $k_o$ may be zero. In a specific embodiment, the caster offset $c_o$ may be +15 millimeters (mm) and the kingpin offset $k_o$ may be +25 mm. In other examples, the caster offset $C_o$ may be greater than or equal to +10 millimeters (mm) and the kingpin offset $k_o$ may be greater than or equal to +20 mm. Many other examples for the caster offset $c_o$ and the kingpin offset $k_o$ may be employed, such as a caster offset $c_o$ of zero and a kingpin offset $k_o$ of zero; a caster offset $c_o$ of +15 mm and a kingpin offset $k_o$ of zero; a caster offset $c_o$ of zero and a kingpin offset $k_o$ of +22.5 mm; and a caster offset $c_o$ of +15 mm and a kingpin offset $k_o$ of +22.5 mm. Other combinations of positive and/or zero values for the caster offset $c_o$ and the kingpin offset $k_o$ are also possible.

Presuming the caster inclination angle $\theta_C$ and the kingpin inclination angle $\theta_K$ are zero degrees, and presuming the camber angle is also zero degrees, the caster trail $c_t$ will match the caster offset $c_o$, and the kingpin trail $k_t$ will match the kingpin offset $k_o$, when the wheels are aligned parallel to the longitudinal centerline of the vehicle, and depicted in FIGS. 2A through 2C.

Figure 3A:
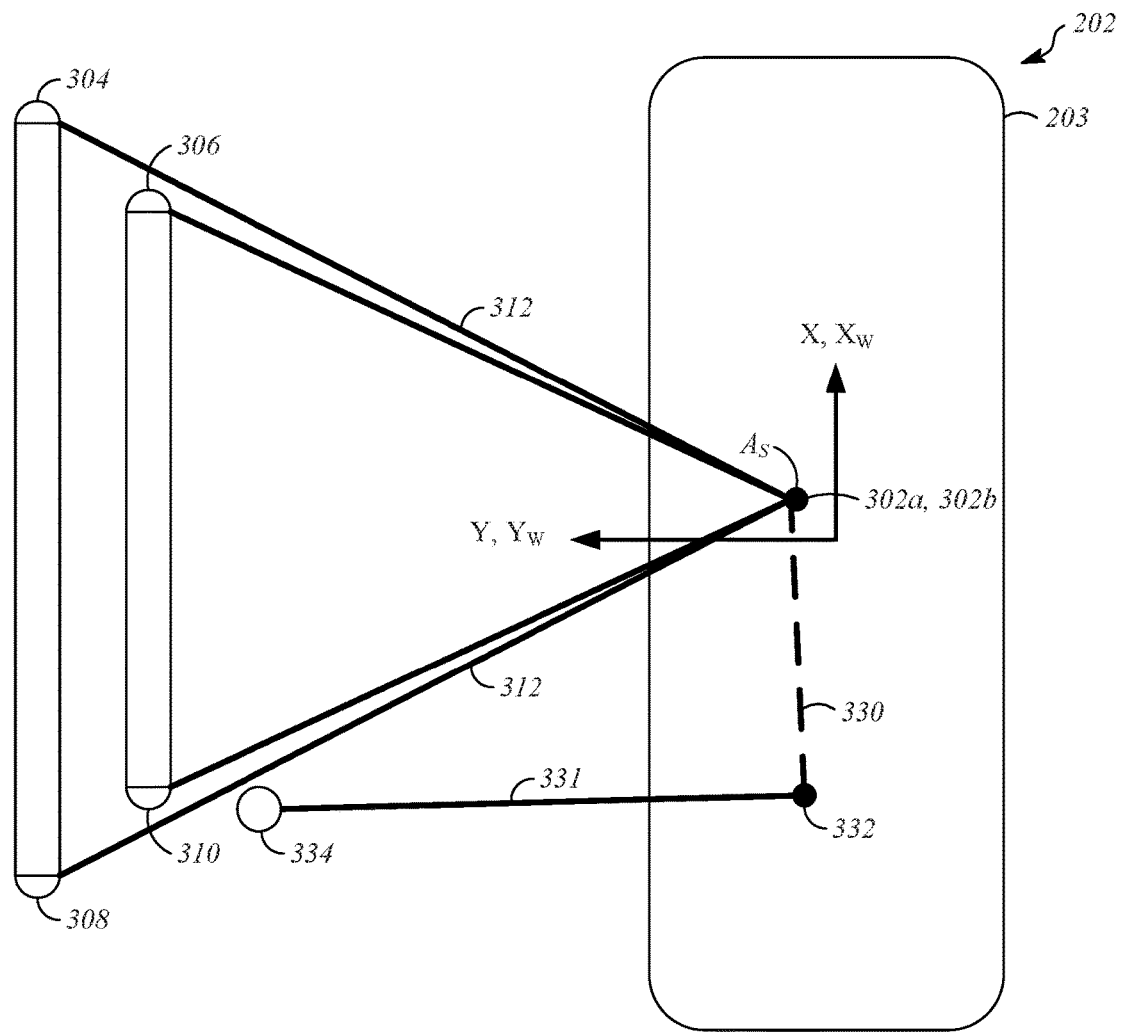
FIG. 3A is a top view of the right front wheel of FIG. 2A, including an example control joint configuration connected with a steering knuckle to define the steering axis.
Figure 3B:
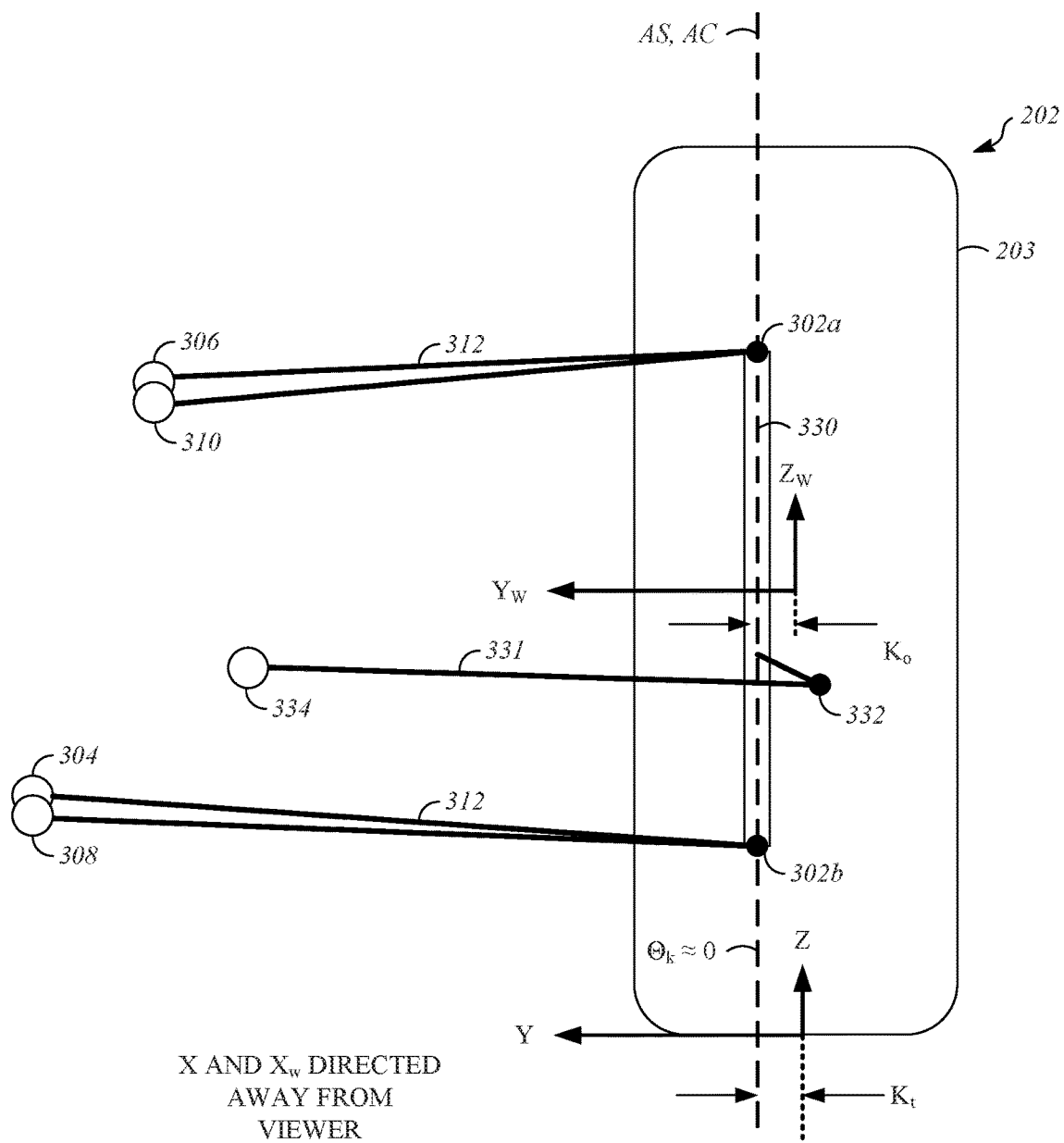
FIG. 3B is a rear view of the right front wheel of FIG. 2A, including the example control joint configuration connected with the steering knuckle to define the steering axis.

FIGS. 3A and 3B depict an example control joint configuration connected with a steering knuckle 330 to define the steering axis $A_S$ described above for the right front wheel 202 of FIGS. 2A through 2C. More specifically, FIG. 3A is a top view of the right front wheel 202, and FIG. 3B is a rear view of the right front wheel 202, including the example control joint configuration connected with the steering knuckle 330. FIGS. 3A and 3B provide a schematic, rather than literal, view of the steering knuckle 330 and associated suspension components 312 to simplify the views and associated discussion.

As shown in FIGS. 3A and 3B, the steering knuckle 330, in conjunction with the suspension components 312, defines the steering axis $A_S$ by way of the position of outer control joints 302a, 302b (more specifically, an upper outer control joint 302a and a lower outer control joint 302b), wherein the outer control joints 302a, 302b lie on the steering axis $A_S$. In some examples, the outer control joints 302a, 302b may be ball joints or any other joints that allow rotation of the right front wheel 202 about the steering axis $A_S$, as well as vertical movement relative to a frame or other portion of the vehicle. As illustrated in FIGS. 3A and 3B, the steering of the right front wheel 202 may occur by way of a tie rod 331 connected to the steering knuckle 330 at an outer tie rod joint 332. An inner tie rod joint 334 may be employed to connect the tie rod to a steering mechanism, such as a rack-and-pinion arrangement, which may, in turn, be controlled by a steering motor. Other examples of components and arrangements that may be utilized to turn the right front wheel 202 via the steering knuckle 330 are also possible.

Each of the outer control joints 302a, 302b may be connected to one or more inner control joints to facilitate the vertical movement of the right front wheel 202 relative to the frame or other portions of the vehicle. In the example of FIGS. 3A and 3B, an inner front upper control joint 306 and an inner rear upper control joint 310 are both connected to the upper outer control joint 302a, while an inner front lower control joint 304 and an inner rear lower control joint 308 are connected to the lower outer control joint 302b. The inner control joints 304, 306, 308, and 310 may be connected to a frame or other structure of the vehicle, and may be of any type of joint that facilitates the vertical movement of the right front wheel 202 relative to the vehicle, as described herein. The frame or other structure is represented by the "rods" of FIGS. 3A and 3B connecting the inner upper control joints 306 and 310 together, and connecting the inner lower control joints 304 and 308 together, but other structures or components may serve a similar purpose in other examples. The components that connect the inner control joints 304, 306, 308, and 310 to the outer control joints 302a and 302b each may be one or more control arms, linkages, and/or other suspension components that facilitate the vertical movement of the right front wheel 202 as discussed herein.

In some implementations, the inner control joints 304, 306, 308, and 310, the outer control joints 302a and 302b, as-well-as the outer tie rod joints 332 and the inner tie rod joints 334 are configured to provide one or more particular kinematic constraints. In some examples, the control joints may be configured so as to provide roll steer compensation to facilitate zero roll steer during an opposite wheel travel scenario (e.g., one of the wheels 102 moving upward while an opposite one of the wheels 102 is moving downward, or vice-versa), or a roll scenario.

Also, in some examples, the control joints 304, 306, 308, 310, 302a, and 302b, as-well-as the outer tie rod joints 332 and the inner tie rod joints 334 may be configured to enforce full roll camber compensation (in the case of opposite wheel travel) and/or full bump camber compensation (in the case of parallel wheel travel, in which the wheels move up and down together). In either case, full camber compensation may maintain the static camber angle throughout the vertical travel of the right front wheel 202. In other implementations, the control joints may enforce semi-camber compensation for one or both of opposite wheel travel and parallel wheel travel.

In some examples, employing and maintaining the steering axis $A_S$ described above may result in one or more benefits. For example, a vertical or nearly steering axis $A_S$ may facilitate the use of smaller, lighter, and/or less expensive suspension than what is current employed in conventional vehicle suspension systems, and may also facilitate the use of a lighter steering motor and lower energy consumption to steer the wheels 102. Moreover, a relatively small positive caster trail $c_t$ may facilitate self-alignment of the wheels 102 even at lower speeds, at which the wheel self-alignment due to small lateral forces is reduced. Moreover, a relatively small positive caster trail $c_t$ will facilitate self-alignment of the wheels 102 at higher slip angles where the pneumatic trail moves towards the wheel center, reducing the effect of self-alignment, since the aligning torque will have practically no lever-arm (the pneumatic trail) to act upon. Also, a relatively small positive kingpin trail $k_t$ may allow the effective use of "steer-by-brake" functionality, which is described in greater detail below. Further, maintaining camber angle during steering and vertical wheel travel helps maintain these potential benefits while operating the vehicle in multiple circumstances. In some examples, maintaining the kingpin axis $A_K$ to be parallel with the static camber may enhance the effect of the positive kingpin trail $k_t$ for steer-by-braking. Moreover, in some implementations, the kingpin offset $k_o$ may be decreased as the kingpin inclination angle $\theta_K$ is increased to match the static camber to maintain a kingpin trail $k_t$ that remains relatively small and is yet sufficient for steer-by-brake functionality.

While the above discussion focuses on the right front wheel 202 from the wheels 102, the left front wheel, or another wheel tasked with steering the vehicle, may also incorporate the corresponding suspension aspects presented above.

Figure 4:
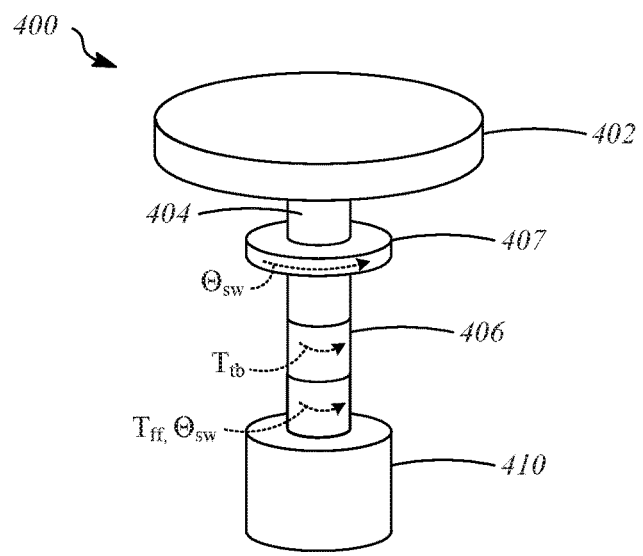
FIG. 4 is a graphical depiction of an example steering column module to be employed in a steer-by-wire configuration for a vehicle.

FIG. 4 is a graphical depiction of an example of a steering column module 400 to be employed in a steer-by-wire configuration for a vehicle. As shown in the example of FIG. 4, the steering column module 400 may include a steering wheel 402, an input shaft 404 with a steering wheel angle sensor 407, a torsion bar 406, and a force feedback motor 410 for direct force-feedback motor angle, torque or angle control. In operation, a driver may apply steering torque to the steering wheel 402 (e.g., serving as the steering input device 116 of FIG. 1), which may be transmitted to the input shaft 404 and the torsion bar 406. The steering wheel angle sensor 407 may measure a steering wheel angle $\theta_{SW}$ imposed by the driver upon the steering wheel 402, and the torsion bar 406 may measure a steering torque $T_{TB}$. The steering wheel angle sensor 407 and/or the torsion bar 406 may serve as the manipulation sensor 114 of FIG. 1. In addition, to provide feedback to the driver, the force feedback motor 410 (e.g., serving as the steering input device motor 118 of FIG. 1) may provide a torque TFF resulting in an angle $\theta_{FF}$ via the input shaft 404 to the steering wheel 902 by way of, for example, a steering feel controller (e.g., the global controller 140 of FIG. 1) and a force feedback motor controller (e.g., the steering input device motor controller 120 of FIG. 1). In one example, the upper end (e.g., the end nearest the steering wheel angle sensor 407) and the lower end (e.g., the end nearest the force feedback motor 410) of the torsion bar 406 may be seated on roller bearings. Further, the upper end of the torsion bar 406 may be rigidly connected to the input shaft 404 using, for example, a sleeve coupling or Hirth joint, while the lower end of the torsion bar 406 may be connected to the force feedback motor 410 by way of a flexible coupling that exhibits little angular play, such as a beam or helical coupling, Hardy disc, or constant velocity (CV) joint. The steering column module 400 of FIG. 4 represents just a single example, and other examples employing other components, and arrangements thereof, are also possible.

Figure 5:
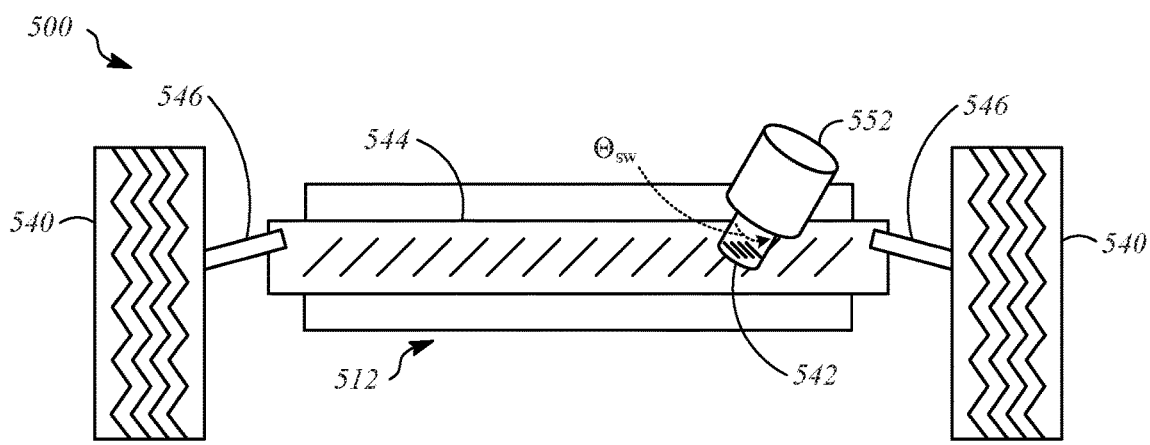
FIG. 5 is a graphical depiction of an example steering rack module to be employed in a steer-by-wire configuration for a vehicle.

FIG. 5 is a graphical depiction of an example of a steering rack module 500 to be employed in a steer-by-wire configuration for a vehicle. The steering rack module 500 is an example of a steering system that is connected to a suspension component and controls a steering angle of a wheel based on an electronic control signal. In the particular example of FIG. 5, the steering rack module 500 may be an electrically-powered steering system and include a steering motor 552, which may serve as the steering motor 108 of FIG. 1, to operate a rack-and-pinion system 512 under direct position control, such as in a servo-drive manner. While discussed as a rack-and-pinion, other options are available. For example, the rack-and-pinion system 512 may include a rack along with some form of transmission such as a worm gear, ball-screw, and the like, to interoperate with the rack. Other components of the steering rack module 500 may include a pinion gear 542 and a steering rack 544, operating as the rack-and-pinion system 512 (e.g., serving as the steering mechanism 106 of FIG. 1). In this embodiment, the steering motor 552 may be controlled electronically via a steering motor controller, such as the global controller 140 and the steering motor controller 110 of FIG. 1, as explained earlier. The steering motor 552, in turn, may cause rotation of the pinion gear 542 or worm wheel through a pinion angle θp that is also an extension of, or connected to, the steering motor 552. The pinion gear 542 may operate to translate the steering rack 544 left and right, thus steering the wheels 540 via tie rods 546 (e.g., serving as the tie rods 331 of FIGS. 3A and 3B). If, instead, a worm wheel is employed, the worm wheel may cause translation of the steering rack 544 by interacting with teeth or similar structures incorporated into the steering rack 544 according to a worm drive arrangement. Other implementations in which the steering motor 552 may interact with the steering rack 544 may be implemented in other examples. Moreover, other types of steering systems aside from the rack-and-pinion system 512 of FIG. 5 may be employed in the steering rack module 500 in other examples.

Figure 6:
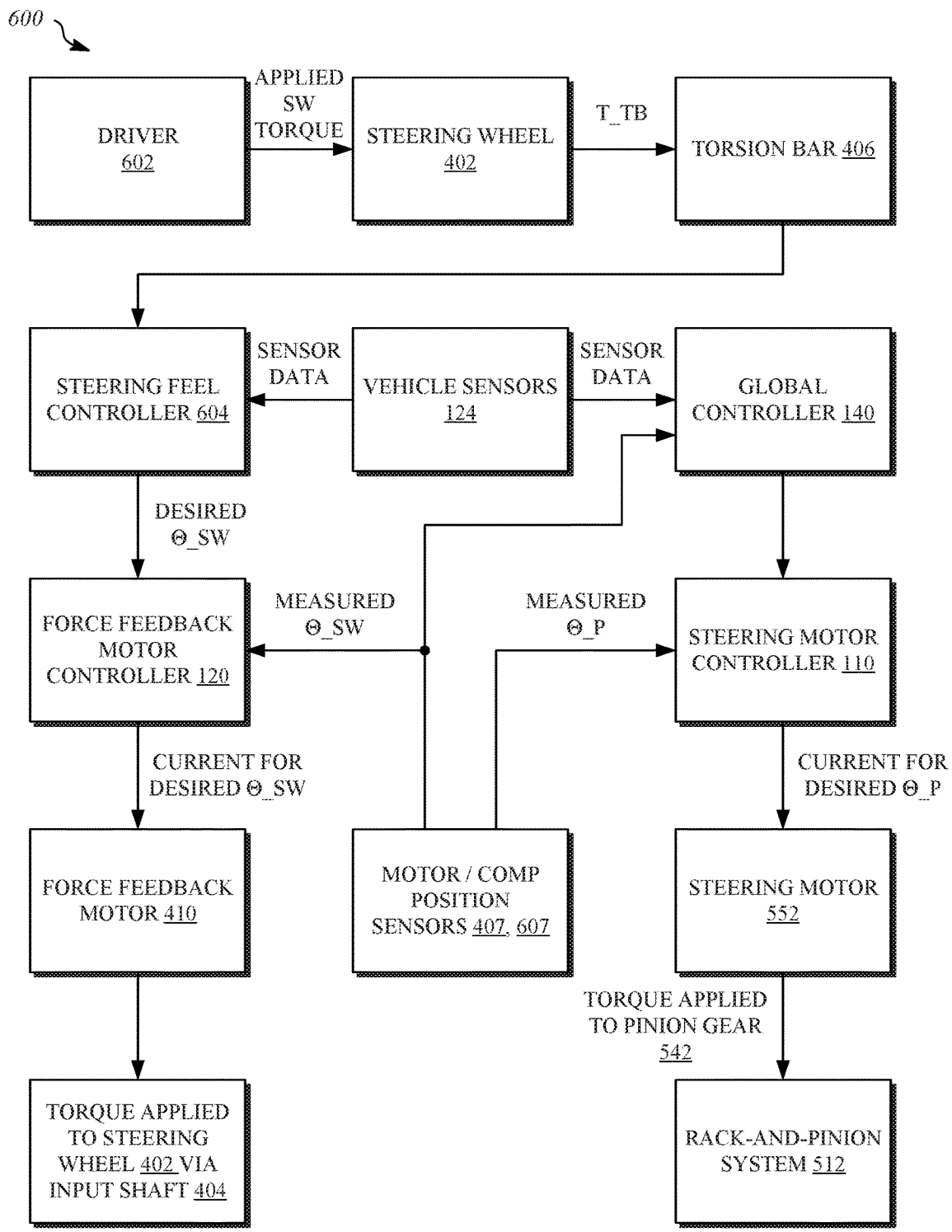
FIG. 6 is a flow diagram of an example control method for operating the example steering column module of FIG. 4 and the example steering rack module of FIG. 5.

FIG. 6 is a flow diagram of an example of a control method 600 for operating the steering column module 400 of FIG. 4 and the steering rack module 500 of FIG. 5 in conjunction with the example suspension systems described herein with respect to FIGS. 2A through 2C, 3A, and 3B in a steer-by-wire arrangement. In this example, the steering motor 552 is configured to provide user-directed, autonomous, and/or semi-autonomous steering functionality, while the force feedback motor 410 facilitates the steering "feel," haptic feedback, and other feedback functionality to the steering wheel 402.

In the control method 600, the torsion bar 406 (or other torque detector) may detect the torque $T_{TB}$ imposed upon the steering wheel 402 by a driver 602, and provides an indication of that torque $T_{TB}$ to a steering feel controller 604, which may provide a sort of synthetic steering "feel" and other feedback to the driver 602, as mentioned earlier. In one example, the steering feel controller 604 may be embodied within the global controller 140 of FIG. 1, or may exist as a separate controller. The steering feel controller 604 may also receive sensor data from the one or more vehicle sensors 124 of FIG. 1, such as, for example, accelerometers, gyroscopes, cameras, radar sensors, temperature sensors, precipitation/humidity sensors, and so on, to provide data indicating vehicle speed, vehicle yaw rate, lateral acceleration, vehicle steering angle, level of precipitation, nearby objects or obstacles, and the like. In at least some embodiments, the steering feel controller 604 may employ the received information in what may be referred to as a "virtual dynamics" model to emulate a physical system in providing a particular feel or experience to the driver 602 via the steering wheel 402. In one embodiment, the steering feel controller 604 repeatedly calculates a desired steering wheel angle $\theta_{SW}$ for the imposed torque $T_{TB}$ as that torque changes based on a "mass (m), spring (k), damper (b)" system. For example, using the Laplace transform of a mass (m), spring (k), damper (b) system:

$$\theta_{SW} = \frac{1}{ms^2 + bs + k} T_{TB}$$

The desired steering wheel angle $\theta_{SW}$ may then be presented to a force feedback (or steering input device) motor controller 120 (FIG. 1), which may also receive an indication of the current measured steering wheel angle $\theta_{SW}$ to create an appropriate level of electrical current for the force feedback motor 410 (FIG. 4) to apply the desired steering wheel angle $\theta_{SW}$ at the steering wheel 402 via the input shaft 404.

Concurrently, the global controller 140 (FIG. 1) or other controller may receive the current measured steering wheel angle $\theta_{SW}$ from the steering wheel angle sensor 407 (FIG. 4), as well as sensor data and the one or more vehicle sensors 124, to generate an indication of a desired pinion angle θp for the rack-and-pinion system 512 (FIG. 5) based on the input provided by the driver 602 via the steering wheel 402. In some examples, the global controller 140 may provide at least some level of steering autonomy to supplement or replace the input from the driver 602 via the desired pinion angle θp, which is then supplied to the steering motor controller 110 (FIG. 1), which may also receive one or more current motor or component angles, such as the current measured pinion gear angle θp. Using these inputs, the steering motor controller 110 may determine and provide a particular level of electrical current to be applied to the steering motor 552 (FIG. 5) to apply torque to the pinion gear 542 of the rack-and-pinion system 512. These particular operations of the control method 600 may be repeated deterministically hundreds of times per second, resulting in continuous control of the vehicle suspension system 100.

Figure 7:
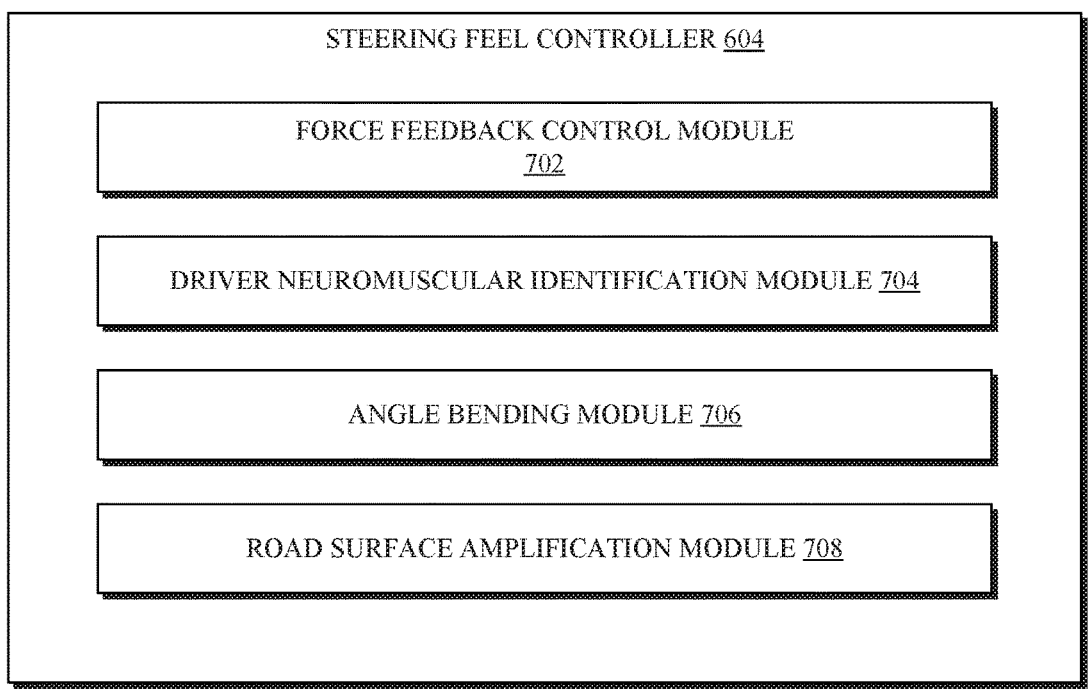
FIG. 7 is a block diagram of an example of a steering feel controller for providing feedback force to a steering wheel.

FIG. 7 is a block diagram of example modules employable within the steering feel controller 604 of FIG. 6 for providing feedback force to the steering wheel 402. The modules may include a force feedback control module 702, a driver neuromuscular identification module 704, an angle blending module 706, and a road surface amplification module 708. In some examples, the steering feel controller 604 may implement each module 702-708 by executing instructions stored in a memory that cause the steering feel controller 604 to perform operations associated with each of the modules 702-708, as described below.

The force feedback control module 702 may be configured to provide physical feedback, such as haptic feedback or other types of force feedback, via positional control of the steering wheel 402 to the driver 602 via the steering input device motor controller 120, the force feedback motor 410, and the input shaft 404, as described above in conjunction with FIG. 6. Such feedback may include, for example, simulation of the feel provided by a steering wheel that is mechanically connected to a steering mechanism, such as the rack-and-pinion system 512 of FIG. 5. Additional feedback may include haptic feedback that may warn the driver 602 of potential road hazards or conditions, of autonomous or semiautonomous actions taken by the global controller 140 in controlling the rack-and-pinion system 512, and so on, including combinations thereof.

In some embodiments, a steering force/haptic feedback model incorporated within the force feedback control module 702 may provide one or more sets of rules and/or equations (e.g., such as what may be used as part of a control or feedback loop arrangement) that determine various functional aspects of the force feedback control module 702 over time, such as whether any feedback is provided to the driver via the steering wheel 402, what type of feedback (e.g., stiffness of the steering wheel 402 as perceived by the driver 602 to influence driving behavior, vibration of the steering wheel 402 to alert the driver 602 to an emergent condition, etc.), what level of feedback to apply, the amount of control the driver 602 is allowed over the rack-and-pinion system 512 (e.g., complete, partial, or none), what type of autonomous action to take via the rack-and-pinion system 512 (e.g., gently steering the vehicle to remain within a current traffic lane, more radically altering the direction of the vehicle to avoid a detected obstacle, etc.), what kind of control to apply to the steering wheel 402 while the global controller 140 assumes control of the rack-and-pinion system 512 (e.g., allowing the steering wheel 402 to move freely, to lock the steering wheel 402 in place, etc.), and the like.

The driver neuromuscular identification module 704 may be configured to determine one or more aspects of the neuromuscular characteristics of the driver 602 and to adapt one or more aspects of the force feedback control module 702 to those neuromuscular characteristics, thus personalizing the operation of the force feedback control module 702 to the driver 602. In some examples, the driver neuromuscular identification module 704 may estimate the neuromuscular admittance (e.g., a dynamic mapping of force to motion) of the driver 602 in operating the steering wheel 402 in order to determine appropriate levels of torque to be applied via the force feedback motor 410 to provide the steering feel, haptic feedback, and other functionality to the driver 602. Such estimates may be made "offline" (e.g., when the vehicle is stationary) by testing the ability of the driver 602 to maintain constant force or position of the steering wheel 402 while the force feedback motor 410 is used to apply various levels of torque to the steering wheel 402. In some implementations, the neuromuscular admittance of the driver 602 may be considered as an inertia-spring-damper (second-order) system. The result of the testing may be the generation of a torque profile that enhances the operation of the force feedback control module 702 such that less counter-steering torque, more effective driver perceptibility of haptic feedback, and greater driver comfort are provided. Moreover, safer autonomous-to-manual handoff from the global controller 140 to the driver 602 may also be achieved.

The angle blending module 706 may be configured to reduce or eliminate detected misalignment between the steering wheel angle (e.g., the current measured steering wheel angle $\theta_{SW}$) and the translational position of the steering rack 544 that may occur during normal operation of the steering motor 552 and the force feedback motor 410. The angle blending module 706 may re-synchronize the steering wheel 402 and the steering rack 544 smoothly over time, or more quickly at one or more opportune times, such as at startup of the vehicle, at the end of a steering stroke by the driver 602, when the misalignment reaches some predetermined value, and/or the like.

The road surface amplification module 708 may be configured to amplify or diminish feedback to the driver 602 via the steering wheel 402 that may be based on a current detected road condition. For example, feedback to the driver 602 may be enhanced or amplified in some way (e.g., vibration, torque, etc.) as a detected grip of the tires on the road surface approaches some critical level or limit. In other cases, feedback to the driver 602 indicating a rough road surface may be amplified or diminished, based on one or more factors. In some embodiments, the amount of amplification or reduction may be determined at least in part on a type of driving (e.g., aggressive versus relaxed) involved. For example, repeated turns on a canyon road may cause the road surface amplification module 708 to amplify road surface feedback, while a detected highway drive of few or gentile turns may cause the road surface amplification module 708 to diminish such feedback.

Figure 8:
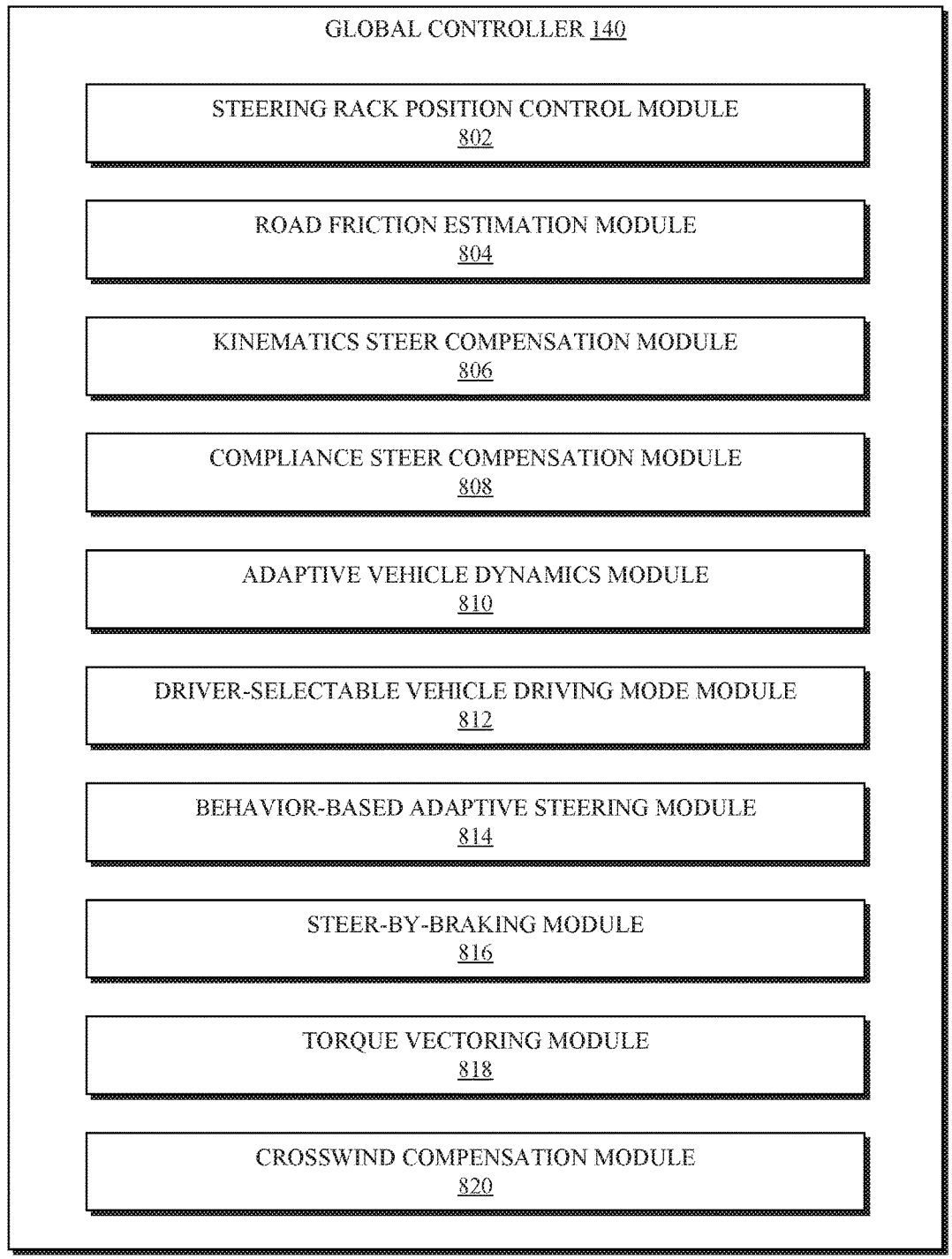
FIG. 8 is a block diagram of an example of a global controller.

FIG. 8 is a block diagram of example modules employable within the global controller 140 of FIGS. 1 and 6 for steering a wheel of a vehicle. The modules may include a steering rack position control module 802, a road friction estimation module 804, a kinematics steer compensation module 806, a compliance steer compensation module 808, an adaptive dynamics module 810, a driver-selectable vehicle driving mode module 812, a behavior-based adaptive steering module 814, a steer-by-braking module 816, a torque vectoring module 818, and a crosswind compensation module 820. In some examples, the global controller 140 may implement each module 802-820 by executing instructions stored in a memory that cause the global controller 140 to perform operations associated with each of the modules 802-820, as described below.

The steering rack position control module 802 may be configured to control a position of the steering mechanism (e.g., the rack-and-pinion system 512 of FIG. 5) via the steering motor controller 110 and the steering motor 552, as discussed above in connection with FIG. 6. The control may be based on input provided by the driver 602 via the steering wheel 402, and/or via autonomy or semi-autonomy commands generated at the global controller 140 based on one or more items, such as navigational input, road conditions, detected obstacles, and so on. In some examples, the steering motor 552 is operated in a servo-drive manner, possibly employing configurable parameters that influence overshoot, response time, steering rack translational speed and acceleration limits, and the like.

The road friction estimation module 804 may be configured to estimate a coefficient of friction for the road surface, which may then be employed in other modules of the global controller 140 and/or the steering feel controller 604. In some embodiments, the road friction estimation module 804 may use known properties of the suspension (e.g., the caster trail $c_t$ and the kingpin trail $k_t$) as a function of the position or displacement of the steering mechanism (e.g., the steering rack 544) and the vertical travel of the wheel. The road friction estimation module 804 also may measure (e.g., using force measurement cells in the tie rods 546) or estimate (e.g., using a measured steering motor 552 current and a dynamic model of the steering rack module 500) the forces imposed on the steering rack 544. The components of these forces are due to the mechanical properties of the suspension (jacking, trails, etc.) and the pneumatic properties of the tires may then be separated using the suspension properties, in combination with an estimate or measurement of the body slip angle of the vehicle, as well as one or more properties of the tires mounted on the wheels, to estimate the road friction coefficient.

The kinematics steer compensation module 806 may be configured to adjust the operation of the steering motor 552 to compensate for unintended steering effects due to the kinematic properties of the suspension, such as an amount of road wheel angle induced by single wheel travel, parallel wheel travel, or opposite wheel travel. Such information may be stored in a look-up table that organizes the information based on steering rack 544 position or displacement, as well as on vertical wheel travel (e.g., as measured by displacement sensors in the suspension). The kinematics steer compensation module 806 may then compare the determined road wheel angle against the corresponding road wheel angle of the no-vertical-compression case and adjust the steering rack 544 via the steering motor 552 accordingly to compensate for the effect of the suspension kinematics on the steering.

The compliance steer compensation module 808 may be configured to adjust the operation of the steering motor 552 to compensate for unintended steering effects due to the compliance properties of the suspension. An example of compliance may be provided by the elastic properties of the intentionally non-rigid components, such as bushings (often fabricated from rubber or synthetic rubber compounds) or joints, for noise mitigation and other purposes. In some examples, the compliance steer compensation module 808 may receive, access, or estimate an amount of vertical wheel travel, the displacement of the steering rack 544, and/or torque about the wheel center (e.g., using the data generated in the road friction estimation module 804, discussed above). Using data describing characteristics of the wheels, the forces applied to the steering rack 544, and possibly one or more vehicle acceleration measurements, the forces or torques at the tires may be estimated. Those forces may then be used to access values from a look-up table listing compliance characteristics of the suspension to determine the effects of compliance on the steering axis $A_S$. The compliance steer compensation module may then use the resulting compliance information to adjust the steering rack 544 via the steering motor 552 accordingly to compensate for the effect of the suspension compliance on the steering.

In some embodiments, the kinematics steer compensation module 806, the compliance steer compensation module 808, or another module may also adjust the steering rack 544 via the steering motor to account for unintended steering effects due to vehicle loading.

The adaptive dynamics module 810 may be configured to dynamically adjust the steering ratio (e.g., an amount of displacement of the steering rack 544, or a number of degrees of change in the wheel angle, in response to a given amount of rotation imparted on the steering wheel 402 by the driver 602) based on the estimated road friction from the road friction estimation module 804 and vehicle loading conditions. The loading conditions may be measured using a suspension sensor, estimated using a state observer, or the like. Such functionality may facilitate a more linear vehicle steering response irrespective of the road friction coefficient and the vehicle static loading.

The driver-selectable vehicle driving mode module 812 may be configured to adjust the steering ratio, and possibly other aspects of the steering response, based on driver 602 input or selection. Mathematically, in one example, the steering ratio may be the amount of rotation of the steering wheel 402 over the corresponding amount of rotation of the wheels. Accordingly, in some embodiments, the steering ratio may be set relatively high for a comfort steering mode (e.g., "slower" steering), to some intermediate value for a normal steering mode, or to a relatively low level for a sport steering mode (e.g., "faster" steering).

The behavior-based adaptive steering module 814 may be configured to automatically adapt the steering ratio, and possibly other aspects of the steering response, based on the current use of the vehicle, as opposed to an explicit selection by the driver 602. For example, using the steering wheel angle $\theta_{SW}$, a rate of change of the steering wheel angle $\theta_{SW}$, vehicle speed, vehicle lateral acceleration, and/or vehicle longitudinal acceleration, the behavior-based adaptive steering module 814 may determine whether the car is being operated aggressively (e.g., mountain road driving, test track driving, and so on) or more sedately (e.g., highway driving, neighborhood driving) and alter the steering response accordingly. In some implementations, more aggressive driving being detected may result in a lower steering ratio, while less aggressive driving may result in a higher steering ratio. Further, the steering ratio and/or other aspects of the steering response may be modified in small increments over time to acclimatize the driver 602 more gradually, possibly without the driver 602 realizing that such modifications are being made.

The steer-by-braking module 816 may be configured to apply braking (e.g., by way of a brake control module or similar component not explicitly described herein) to one or more wheels to effectuate steering (e.g., self-alignment) of the vehicle, termed "steer-by-braking." In one example, steer-by-braking may be employed in the event of a steering mechanism breakdown, a steering motor 552 failure, or the like, although other conditions may warrant steer-by-braking functionality as well.

Figure 9:
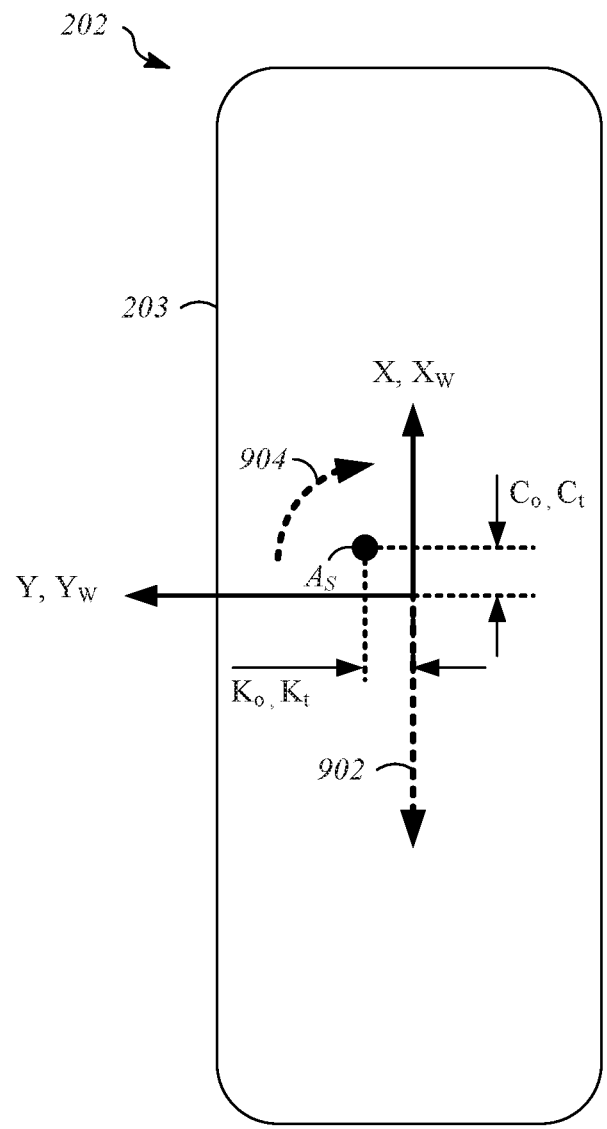
FIG. 9 is a top view of the right front wheel of FIG. 2A depicting the use of a braking force to provide steer-by-brake functionality.

In reference to FIG. 9, which is a top view of the right front wheel 202 of FIG. 2A depicting the use of a braking force 902 to provide steer-by-braking functionality, a positive kingpin trail $k_t$ is maintained, as discussed above according to certain embodiments disclosed herein. In response to the braking force 902, which provides a rearward-directed force at the contact patch, a moment 904 is generated in the clockwise direction about the steering axis $A_S$, causing the right front wheel 202 to turn to the right. Thus, if the right front wheel 202 is engaged in a turn to the left, the steer-by-braking module 816 may engage the brake on the right front wheel 202 to self-align the right front wheel 202 (e.g., turn the right front wheel 202 back toward center alignment). More generally, the steer-by-braking module 816 may employ steer-by-braking by engaging the brake on the wheel located at the outside of the turn (e.g., in which opposite wheel travel may be occurring) to help self-align the wheel. In other embodiments, steer-by-braking may also be employed during straight-line travel (e.g., during single wheel travel or parallel wheel travel) to steer the vehicle.

In some examples, the steer-by-braking module 816 may employ the road friction estimate, the tire characteristic data, and/or the torque estimation process discussed above to regulate the amount of braking force to apply to control the amount of wheel-turning force that results from application of the brake.

Returning to FIG. 8, the torque vectoring module 818 may be configured to operate in conjunction with the steer-by-braking module 816 to enhance steer-by-braking by applying additional propulsion or traction torque to the wheel opposite the wheel to which the braking force is being applied. For example, if a braking force is being applied to the right front wheel 202 during a left-hand turn to force the right front wheel 202 to self-align, torque may be applied to the left wheel, which, in the presence of a positive kingpin trail $k_t$, causes the left wheel to turn right as well due to a moment being generated about the steering axis $A_S$.

In some examples, the steer-by-braking module 816 and/or the torque vector module 818 may also applying braking or torsional forces to other wheels, even those not employed for steering, to create a yaw moment about a z-axis of the vehicle, further facilitating the braking effect of the steer-by-braking module 816.

The crosswind compensation module 820 may be configured to adjust the operation of the steering rack position control module 802 to compensate for the effects of full or partial crosswinds on the vehicle. In one example, the crosswind compensation module 820 may receive or access data indicating a direction and intensity of a crosswind (e.g., from online weather data, from one or more air mass flow sensors on the vehicle, or from one or more load-cell vehicle panels), and adjust the operation of the steering motor 552 to steer the wheels toward the direction from which the crosswind originates to maintain the intended heading of the vehicle.

Figure 10:
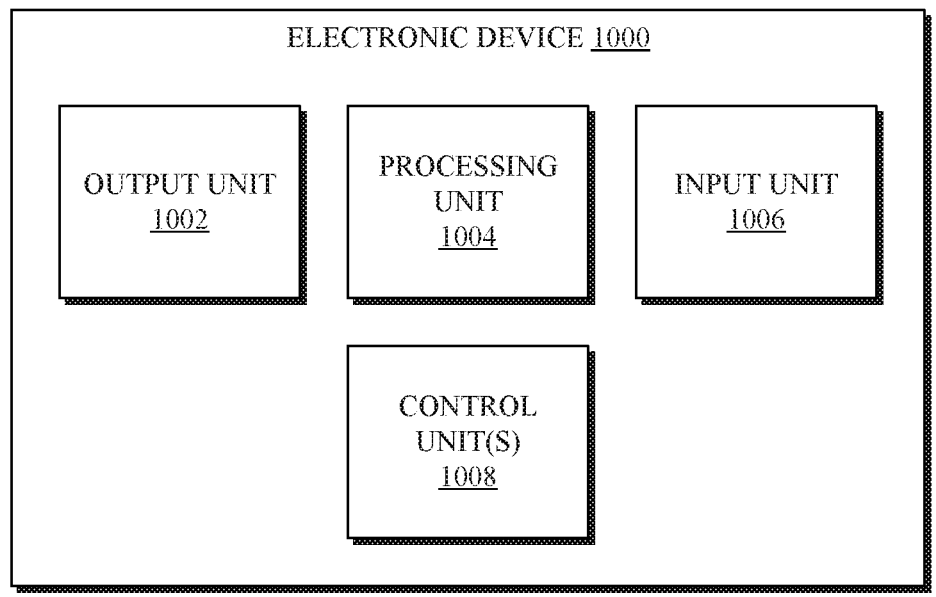
FIG. 10 is a functional block diagram of an electronic device.

Turning to FIG. 10, an electronic device 1000 includes components that are arranged to perform various operations of the presently disclosed technology is shown. The electronic device 1000 may be implemented by hardware or a combination of hardware and software to carry out the principles of the present disclosure. It will be understood by persons of skill in the art that the components of the electronic device 1000 may be combined or separated into sub-blocks to implement the principles of the present disclosure. Therefore, the description herein supports any possible combination or separation or further definition of the components of the electronic device 1000. Moreover, multiple electronic devices 1000 may be employed in various embodiments.

In one implementation, the electronic device 1000 includes an output unit 1002 configured to provide information, including possibly display information, such as by way of a graphical user interface, and a processing unit 1004 in communication with the output unit 1002 and an input unit 1006 configured to receive data from one or more input devices or systems. Various operations described herein may be implemented by the processing unit 1004 using data received by the input unit 1006 to output information using the output unit 1002.

Additionally, in one implementation, the electronic device 1000 includes one or more control units 1008 implementing at least some of the operations noted in FIG. 6, as well as other operations described herein. Accordingly, the control units 1008 may include or perform the operations associated with the global controller 140, the steering feel controller 604, as well as other control circuits, algorithms, or functions described herein.

Figure 11:
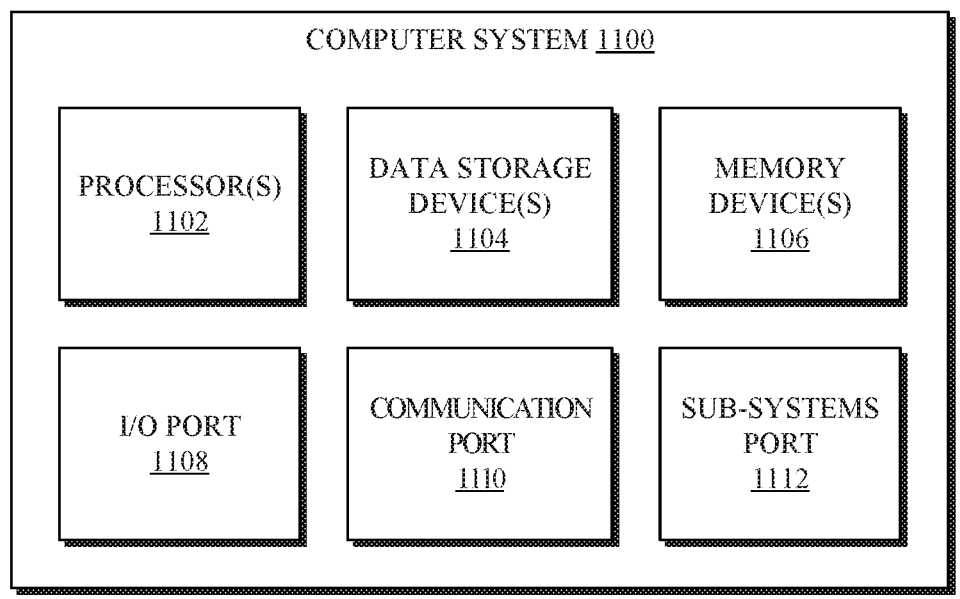
FIG. 11 is an example computing system.

Referring to FIG. 11, a detailed description of a computer system 1100 having one or more computing units that may implement various systems and methods discussed herein is provided. The computer system 1100 may be applicable to, for example, the global controller 140, the steering feel controller 604, and/or similar systems described herein, as well as various control circuits, controllers, processors, and the like described in connection thereto. It will be appreciated that specific implementations of these devices may be of differing possible specific computing architectures, not all of which are specifically discussed herein but will be understood by those of ordinary skill in the art.

The computer system 1100 may be a computing system is capable of executing a computer program product to execute a computer process. Data and program files may be input to the computer system 1100, which reads the files and executes the programs therein. Some of the elements of the computer system 1100 are shown in FIG. 11, including one or more processors 1102, one or more data storage devices 1104, one or more memory devices 1106, and/or one or more ports 1108-1112. Additionally, other elements that will be recognized by those skilled in the art may be included in the computer system 1100 but are not explicitly depicted in FIG. 11 or discussed further herein. Various elements of the computer system 1100 may communicate with one another by way of one or more communication buses, point-to-point communication paths, or other communication means not explicitly depicted in FIG. 11.

The processor 1102 may include, for example, a central processing unit (CPU), a microprocessor, a microcontroller, a digital signal processor (DSP), and/or one or more internal levels of cache. There may be one or more processors 1102, such that the processor 1102 comprises a single central-processing unit, or multiple processing units capable of executing instructions and performing operations in parallel with each other, commonly referred to as a parallel processing environment.

The computer system 1100 may be a conventional computer, a distributed computer, or any other type of computer, such as one or more external computers made available via a cloud computing architecture. The presently described technology is optionally implemented in software stored on the data storage devices 1104, stored on the memory devices 1106, and/or communicated via one or more of the ports 1108-1112, thereby transforming the computer system 1100 in FIG. 11 to a special purpose machine for implementing the operations described herein. Examples of the computer system 1100 include personal computers, terminals, workstations, mobile phones, tablets, laptops, personal computers, multimedia consoles, gaming consoles, set top boxes, embedded computing and processing systems, and the like.

The one or more data storage devices 1104 may include any non-volatile data storage device capable of storing data generated or employed within the computer system 1100, such as computer executable instructions for performing a computer process, which may include instructions of both application programs and an operating system (OS) that manages the various components of the computer system 1100. The data storage devices 1104 may include, without limitation, magnetic disk drives, optical disk drives, solid state drives (SSDs), flash drives, and the like. The data storage devices 1104 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1106 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1104 and/or the memory devices 1106, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1100 includes one or more ports, such as an input/output port 1108, a communication port 1110, and a sub-systems port 1112, for communicating with other computing, network, or vehicle devices. It will be appreciated that the ports 1108-1112 may be combined or separate and that more or fewer ports may be included in the computer system 1100.

The input/output port 1108 may be connected to an I/O device, or other device, by which information is input to or output from the computer system 1100. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computer system 1100 via the input/output port 1108. Similarly, the output devices may convert electrical signals received from computer system 1100 via the input/output port 1108 into signals that may be sensed as output by a human, such as sound, light, and/or touch. The input device may be an alphanumeric input device, including alphanumeric and other keys for communicating information and/or command selections to the processor 1102 via the Input/output port 1108. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computer system 1100 via the Input/output port 1108. For example, an electrical signal generated within the computer system 1100 may be converted to another type of signal, and/or vice-versa. In one implementation, the environment transducer devices sense characteristics or aspects of an environment local to or remote from the computer system 1100, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the computer system 1100, such as, physical movement of some object (e.g., a mechanical actuator), heating or cooling of a substance, adding a chemical substance, and/or the like.

In one implementation, a communication port 1110 is connected to a network by way of which the computer system 1100 may receive network data useful in executing the methods and systems set out herein as well as transmitting information and network configuration changes determined thereby. Stated differently, the communication port 1110 connects the computer system 1100 to one or more communication interface devices configured to transmit and/or receive information between the computer system 1100 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1110 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1110 may communicate with an antenna for electromagnetic signal transmission and/or reception. In some examples, an antenna may be employed to receive Global Positioning System (GPS) data to facilitate determination of a location of a machine, vehicle, or another device.

The computer system 1100 may include a sub-systems port 1112 for communicating with one or more systems related to a vehicle to control an operation of the vehicle and/or exchange information between the computer system 1100 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, steering and/or suspension information and software and other modules and services may be embodied by instructions stored on the data storage devices 1104 and/or the memory devices 1106 and executed by the processor 1102. The computer system 1100 may be integrated with or otherwise form part of a vehicle. In some instances, the computer system 1100 is a portable device that may be in communication and working in conjunction with various systems or sub-systems of a vehicle.

The present disclosure recognizes that the use of such information may be used to the benefit of users. For example, steering and/or suspension information of a vehicle may be employed to provide acceleration and/or braking information, including fault recovery information. Accordingly, use of such information enables calculated control of an autonomous vehicle. Further, other uses for information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 11 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the disclosure is not so limited. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A vehicle, comprising:
a wheel;
a frame;
a suspension component connected to the frame;
a steering knuckle connected to the suspension component and connected to the wheel, wherein the suspension component is operable to control vertical movement of the steering knuckle and the wheel relative to the frame, wherein the suspension component and the steering knuckle define a steering axis for the wheel, wherein the steering axis has a caster inclination angle of zero degrees, wherein the steering axis has a kingpin inclination angle between zero degrees and positive 1.0 degrees, and wherein the suspension component is configured to maintain zero roll steer when the wheel is pivoted about the steering axis; and
a steering system that is connected to the suspension component and controls a steering angle of the wheel based on an electronic control signal.

2. The vehicle of claim 1, wherein the suspension component is connected to the steering knuckle along the steering axis, the suspension component includes an upper control arm connected to an upper portion of the steering knuckle along the steering axis, and the suspension component includes a lower control arm below the upper control arm that is connected to a lower portion of the steering knuckle along the steering axis.

3. The vehicle of claim 1, wherein a caster offset of the steering axis has a positive value that is greater than 10 millimeters.

4. The vehicle of claim 1, wherein a kingpin offset of the steering axis has a positive value that is greater than 20 millimeters.

5. A vehicle, comprising:
a wheel;
a frame;
a suspension component connected to the frame;
a steering knuckle connected to the suspension component and connected to the wheel, wherein the suspension component is operable to control vertical movement of the steering knuckle and the wheel relative to the frame, wherein the suspension component and the steering knuckle define a steering axis for the wheel, wherein the steering axis has a caster inclination angle of zero degrees, and wherein a caster offset of the steering axis has a positive value that is greater than 10 millimeters; and
a steering system that is connected to the suspension component and controls a steering angle of the wheel based on an electronic control signal.

6. The vehicle of claim 5, wherein the steering axis has a kingpin inclination angle between zero degrees and positive 1.0 degrees.

7. A vehicle, comprising:
a wheel;
a frame;
a suspension component connected to the frame;
a steering knuckle connected to the suspension component and connected to the wheel, wherein the suspension component is operable to control vertical movement of the steering knuckle and the wheel relative to the frame, wherein the suspension component and the steering knuckle define a steering axis for the wheel, wherein the steering axis has a caster inclination angle of zero degrees, and wherein the steering axis has a kingpin inclination angle having a same magnitude and an opposite sign as an expected static camber of the wheel, wherein the expected static camber of the wheel is between zero degrees and negative 1.0 degrees, and the kingpin inclination angle is between zero degrees and positive 1.0 degrees; and a steering system that is connected to the suspension component and controls a steering angle of the wheel based on an electronic control signal.

8. The vehicle of claim 7, wherein a caster offset of the steering axis has a positive value that is greater than 10 millimeters.

9. The vehicle of claim 7, wherein a kingpin offset of the steering axis has a positive value that is greater than 20 millimeters.

10. The vehicle of claim 7, wherein the suspension component is configured to maintain zero roll steer when the wheel is pivoted about the steering axis.

11. A vehicle, comprising:
a wheel;
a frame;
a suspension component connected to the frame;
a steering knuckle connected to the suspension component and connected to the wheel, wherein the suspension component is operable to control vertical movement of the steering knuckle and the wheel relative to the frame, wherein the suspension component and the steering knuckle define a steering axis for the wheel, wherein the steering axis has a caster inclination angle of zero degrees, and wherein a kingpin offset of the steering axis has a positive value that is greater than 20 millimeters; and
a steering system that is connected to the suspension component and controls a steering angle of the wheel based on an electronic control signal.

12. The vehicle of claim 11, wherein the steering axis has a kingpin inclination angle between zero degrees and positive 1.0 degrees.

13. A vehicle, comprising:
a wheel;
a frame;
a suspension component connected to the frame;
a steering knuckle connected to the suspension component and connected to the wheel, wherein the suspension component is operable to control vertical movement of the steering knuckle and the wheel relative to the frame, wherein the suspension component and the steering knuckle define a steering axis for the wheel, wherein the steering axis has a caster inclination angle of zero degrees, and wherein the suspension component is configured to maintain zero roll steer when the wheel is pivoted about the steering axis; and
a steering system that is connected to the suspension component and controls a steering angle of the wheel based on an electronic control signal.

14. A vehicle comprising:
a frame having a first lateral side and a second lateral side;
a first wheel located on the first lateral side of the frame;
a second wheel located on the second lateral side of the frame;
a first steering knuckle connected to the first wheel;
a first suspension component that connects the first steering knuckle to the frame, wherein the first steering knuckle and the first suspension component define a first steering axis for the first wheel, the first steering knuckle and the first suspension component facilitate vertical movement of the first wheel relative to the frame, and the first steering axis has a first caster inclination angle of zero degrees;
a second steering knuckle connected to the second wheel;
a second suspension component that connects the second steering knuckle to the frame, wherein the second steering knuckle and the second suspension component define a second steering axis for the second wheel, the second steering knuckle and the second suspension component facilitate vertical movement of the second wheel relative to the frame, and the second steering axis defines a second caster inclination angle of zero degrees;
a steering mechanism that is connected to the first steering knuckle and the second steering knuckle to steer the first wheel and the second wheel;
a steering motor connected to the steering mechanism to operate the steering mechanism;
a steering motor controller that controls the steering motor;
a steering input device that outputs a signal representing user control of the steering input device, wherein the steering input device is mechanically disconnected from the steering mechanism, the steering motor controller is configured to control the steering motor based on the signal from the steering input device;
a first tire mounted on the first wheel; and
a second tire mounted on the second wheel,
wherein the steering motor controller is configured to estimate a friction coefficient of a driving surface contacting the first tire and the second tire using at least one of a measurement or an estimate of a body slip angle of the vehicle, and
wherein the steering motor controller is operable to adjust a steering ratio of the steering input device and a steering ratio of the steering mechanism based on the friction coefficient.

15. The vehicle of claim 14, wherein the steering motor controller is operable to estimate a current wheel angle of the first wheel and the second wheel based on information describing kinematic properties of the first suspension component and the second suspension component based on a position of the steering mechanism and a measured vertical travel of the first wheel and the second wheel, and to adjust the position of the steering mechanism based on a comparison of the current wheel angle of the first wheel and the second wheel with a road wheel angle associated with a no-vertical-compression state.

16. The vehicle of claim 14, wherein the steering motor controller is operable to estimate a current wheel angle of the first wheel and the second wheel based on information describing compliance properties of the first suspension component and the second suspension component, and to adjust a position of the steering mechanism based on a comparison of the current wheel angle of the first wheel and the second wheel with a desired road wheel angle of the first wheel and the second wheel.

17. The vehicle of claim 14, further comprising:
a first brake connected to the first wheel;
a second brake connected to the second wheel; and
a brake controller that is operable to operate the first brake and the second brake independently,
wherein the first steering axis further defines a first kingpin offset having a positive value,
the second steering axis further defines a second kingpin offset having a positive value, and
the brake controller is operable to operate one of the first brake or the second brake to steer the vehicle to apply a moment to at least one of the first kingpin offset or the second kingpin offset to self-align at least one of the first wheel or the second wheel.

18. The vehicle of claim 17, further comprising:
a propulsion motor that is connected to the first wheel and the second wheel; and
a propulsion motor controller that is operable, during braking of the one of the first wheel or the second wheel, to cause the propulsion motor to apply a propulsion torque to the other of the first wheel or the second wheel.

19. The vehicle of claim 14, wherein the steering motor controller is operable to determine a magnitude of a current crosswind affecting the vehicle, and to adjust operation of the steering motor based on the magnitude of the current crosswind.

\* \* \* \* \*